Sept. 22, 1953  D. B. FERGUSON  2,652,990
CASTING REEL

Filed Nov. 6, 1948  2 Sheets-Sheet 1

Inventor
DANIEL B. FERGUSON
By Lamphere and Van Valkenburgh
Attorneys

Sept. 22, 1953     D. B. FERGUSON     2,652,990
CASTING REEL
Filed Nov. 6, 1948     2 Sheets-Sheet 2
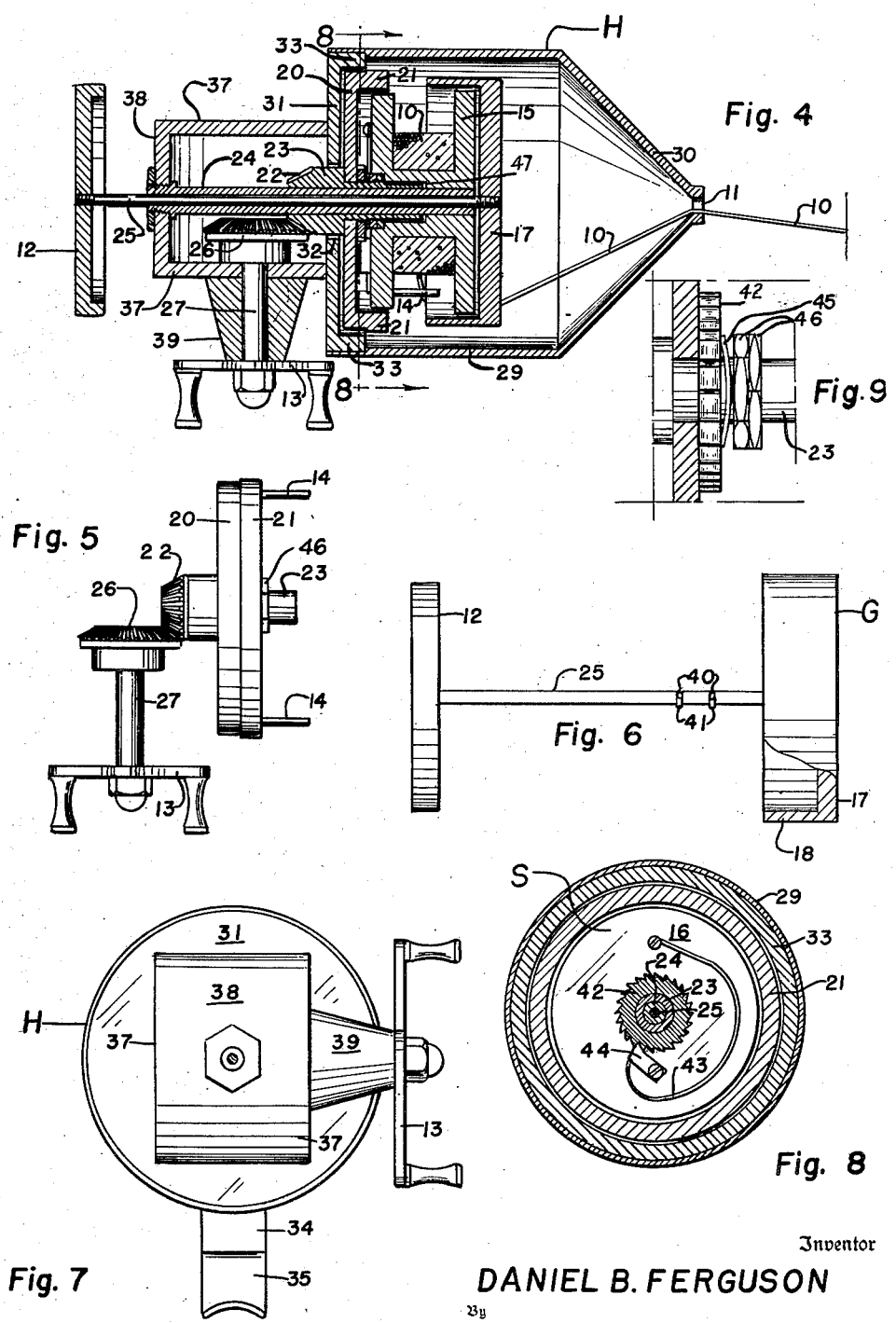
Inventor
DANIEL B. FERGUSON Patented Sept. 22, 1953

2,652,990

UNITED STATES PATENT OFFICE 2,652,990

CASTING REEL

Daniel B. Ferguson, Denver, Colo.

Application November 6, 1948, Serial No. 58,643

14 Claims. (Cl. 242—84.5)

This invention relates to casting reels utilized in fishing, and more particularly to casting reels of the so-called "spinning" type, in which the fishing line passes off the end of a spool during casting. This invention relates generally to the subject matter of my copending applications Serial No. 748,051, filed May 14, 1947, now Patent No. 2,551,320, and Serial No. 784,962, filed November 10, 1947, now Patent No. 2,551,321, each entitled "Casting Reel."

A previous casting reel of the spinning type, which is quite well known, consists of a spool mounted with its axis parallel to the axis of the rod on which the spool is mounted. During casting, the line, which is wound on the spool, passes off the end of the spool toward the tip of the rod. When the line is to be wound in, a pickup arm or finger, which is placed in a non-interfering position during casting, is swung back into winding position, and forces the line to travel around onto the spool as the arm rotates. Such a spool is, of course, stationary at all times, but the rotating arm tends to foul the line and also may be in various positions when the fisherman wishes to start winding in. Thus, it is often necessary to search for the arm, which sometimes delays the start of the winding operation sufficiently, so that the fish may be lost.

In another type of reel, a rotatable, reversely curved winding plate having a scalloped rear edge, i. e. provided with indentations, is disposed at one end of a spool and is moved inwardly for winding and outwardly for unwinding. The plate is rotated for winding, the line catching in one of the indentations, but the necessity for moving axially a plate which is also rotated, unduly complicates the mechanism for actuating the plate. Also, the indentations in the rear edge of the plate tend to interfere with the line during unwinding or casting.

In my copending application Serial No. 748,051, now U. S. Patent No. 2,551,320, there is disclosed a casting reel which comprises, in general, a housing adapted to be attached to a fishing rod in the usual manner, the housing being divided into two parts—a base and a cover, both preferably being made of transparent material, such as a plastic resin. The spool is mounted on the base within the cover, and is rotatable by a handle extending from the base, while the cover carries a line guide, which is movable from an unwinding position (substantially on the axis of the spool) to a winding position (transverse to the axis of the spool and in alignment with the space between the spool flanges). In the unwinding position, the line passes freely off the end of the spool, while in the winding position the spool is turned to cause the line to wind thereon.

In my copending application Serial No. 784,962, now U. S. Patent No. 2,551,321, there is disclosed a casting reel which comprises, in general, a normally stationary spool and a hemispherical or somewhat similarly shaped housing which encloses the spool and is rotatable with respect thereto, the housing providing a support for a tubular line guide which is rotatable thereon and thereby provides a handle for rotating the housing. The line preferably passes axially through the handle, and the handle is mounted on a guide strip so as to be movable from a position in which its axis is parallel with that of the spool, in which position the line may be wound onto the spool, to a position in which the inner end of the handle is disposed axially of the spool and the handle points forwardly, so that the line may unwind over the end of the spool and pass through the handle, as during casting. In the reel of each of my copending applications, the axis of the spool extends transversely to the longitudinal axis of the fishing spool, and during casting the line passes to the side, off the end of the spool, and then forwardly along the pole, through the guide.

Among the objects of the present invention are to provide a novel casting reel of the spinning type; to provide such a reel in which the axis of the spool may extend in the same direction as the axis of the fishing pole; to provide such a reel in which the fishing line is accurately guided onto and off the spool, and also in which the line is wound onto the spool in a directly reverse manner to that in which it passed off the spool, so that the tendency for the line to knot or kink is minimized, and the line is also easily wound onto the spool and passes readily off the spool; to provide such a reel in which the change-over from casting to winding position does not involve movement of the elements which wind the line back onto the spool; to provide such a spool in which the element for changing the reel from casting or unwinding to reeling or winding position, and vice versa, remains in the same general position; to provide such a reel in which the line may be guided onto and off the spool over a relatively smooth surface, which does not require indentations to wind the line back onto the spool; to provide such a reel in which the spool and the winding mechanism may be completely enclosed; and to provide such a reel in which access to the spool is readily obtained, and which is relatively simple in construction and may be made economically.

Other objects and the novel features of this invention will become apparent from the following description, taken in connection with the accompanying drawings, in which:

Fig. 4 is a longitudinal section taken along line 4—4 of Fig. 2;

Fig. 5 is a top view of a handle and a line winding device, shown apart from other portions of the reel for clarity of illustration;

Fig. 6 is a top view of a line guide and an operating button therefor, also shown apart from other portions of the reel;

Fig. 7 is a rear end view of a major portion of the reel, but taken as a transverse section along line 7—7 of Fig. 2;

Fig. 8 is a transverse section taken along line 8—8 of Fig. 4, which illustrates more clearly a ratchet control mechanism; and Fig. 9 is an enlarged fragmentary section, of a portion of Fig. 4.

Figure 1:
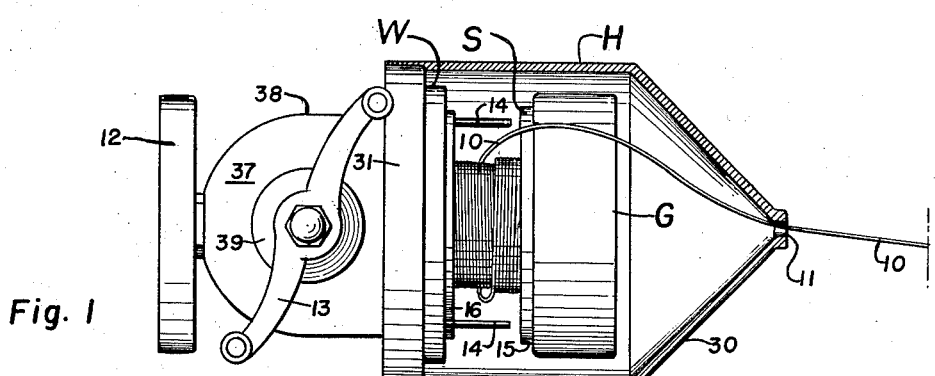
Fig. 1 is a side view of a reel constructed in accordance with this invention and mounted on a fishing rod, a portion of the reel being in section and the reel being in unwinding or casting position.
Figure 2:
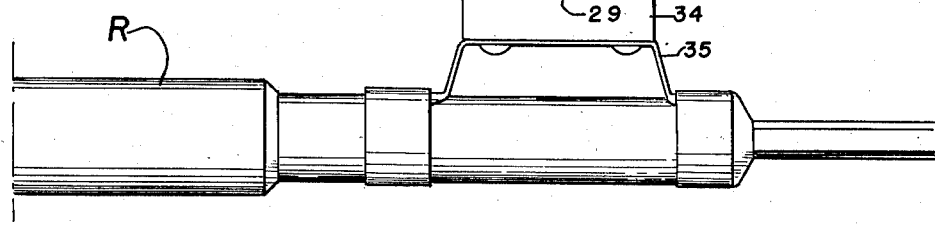
Fig. 2 is a side view of the reel, partly in section and in winding or reeling position.
Figure 2:
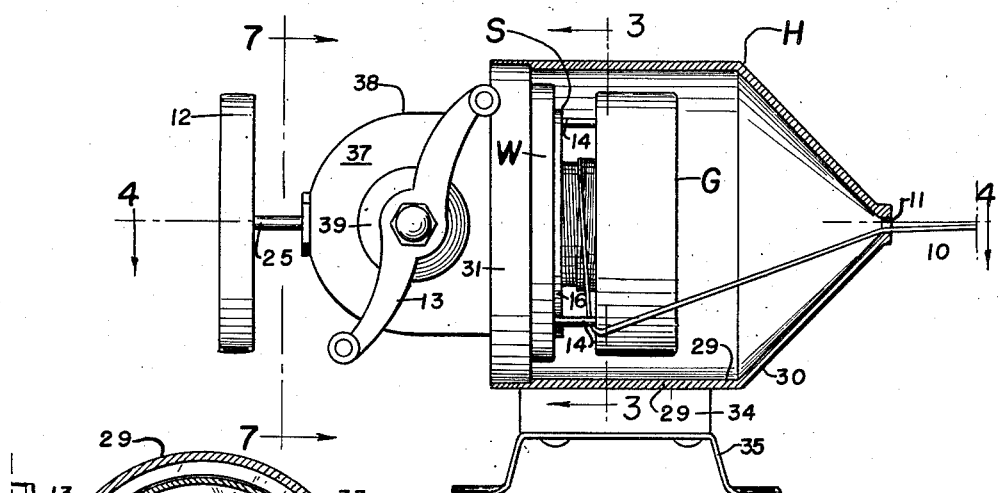

As illustrated in Figs. 1 and 2, a casting reel constructed in accordance with this invention may be mounted on or attached to a fishing rod R, and comprises, in general, a housing H which encloses a normally stationary spool S, on which a fishing line 10 is wound, the longitudinal axis of the spool S being generally parallel to that of the rod R. When in the unwinding or casting position of Fig. 1, the fishing line 10 is adapted to pass off the end of the spool S, around a preferably cylindrical guide G and out through a hole or aperture 11 in the front end of housing H. In the winding or reeling position of Fig. 2, the guide G is disposed rearwardly, to which position it may be moved by a button 12, and a handle 13 may be turned to rotate a winding or reeling device W, so that pins 14 of the winding device W will lay the fishing line 10 onto the spool S, the pins 14 rotating around the spool. As will be evident, only one of the pins 14 normally engages the line 10 during the winding operation.

Figure 3:
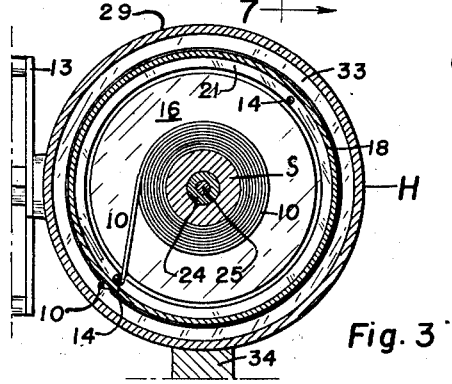
Fig. 3 is a transverse section taken along line 3—3 of Fig. 2.

The spool S, as in Figs. 2 and 4, has a front flange 15 and a rear flange 16, while the guide G, as in Figs. 4 and 6, has an annular body 17 and a rearwardly extending, cylindrical flange 18 which has a smooth outer surface and overlies the front flange 15 of spool S. When the guide G is in the front position of Fig. 1, i. e. the unwinding or casting position, the rear end of flange 15 of the guide G is positioned slightly forwardly of the rear edge of the forward flange 15 of spool S, i. e. uncovering the pins 14 so that the fishing line 10 may pass between the ends of pins 14 and the front flange 15 of the spool. However, when the guide G is moved to the rear position of Figs. 2 and 4, i. e. the winding or reeling position, the flange 18 will cover the front ends of pins 14, so that as the pins 14 rotate, one of the pins will engage the line to force the line onto the spool, as in Figs. 2 and 3. Thus, it is necessary to move the guide G axially only, and no rotation thereof is necessary.

The winding device W, as in Figs. 4 and 5, may include an annular base 20 having a peripheral, cylindrical and forwardly extending rim 21, which partly overlies the rear flange 16 of spool S and on the front edge of which the pins 14 are mounted. The base 20 is attached to a bevel pinion 22, which may be provided with a forwardly extending, tubular body 23, so as to be rotatable about a shaft 24, on the front end of which spool S is mounted and through which extends a rod 25 connecting button 12 with guide G. The bevel pinion 22 is engaged by a bevel gear 26 which produces an increased speed of rotation of the winding device W, such as by a two-to-one ratio, the bevel gear 26 being mounted on the inner end of a shaft 27, on the outer end of which handle 13 is mounted.

The housing H may include a cylinder 29 having a forwardly tapering, cone shaped nose 30, in the front end or point of which is formed the hole 11 through which the fishing line 10 passes. The rear end of cylinder 29 may be closed by an annular plate 31 having a central aperture 32 through which bevel pinion 22 extends, and an annular rim 33 adapted to releasably engage the inner, rear edge of housing cylinder 29. The latter connection enables the housing to be taken apart readily, as for fastening the line 10 to spool S when initially winding thereon, and/or threading the end of line 10 through hole 11.

A base 34 is attached to the bottom of cylinder 29, and provided with a mounting strip 35, adapted to engage a conventional reel mounting connection on rod R. Also, an auxiliary housing section may be attached to plate 31, adapted to enclose the gearing for rotating the winding device W and provide a support for handle 13 and associated parts. The auxiliary housing has two flat sides 37 and a generally semi-cylindrical rear 38, while a frusto-conical bearing and support 39 for shaft 24 is attached to one of the flat sides 37.

As in Figs. 4 and 6, and as indicated previously, the guide G is connected with button 12 by rod 25, to the opposite ends of which the button and guide are respectively attached and which is slidable within shaft 24, the fit therebetween either being frictional, or grooves 40 provided in rod 25, in which arcuate springs 41 are disposed, so that guide G will tend to stay in a set position, but is easily moved. The annular base 20 of winding device W, as in Fig. 4, may be attached to the body 23 of bevel pinion 22, for rotation therewith, by a pin or the like, and a ratchet cogwheel 42 may be disposed forwardly of base 20. As in Fig. 8, the spool S may carry a curved, leaf spring 43 adapted to push a ratchet 44 against the ratchet teeth, so that the winding device W may be rotated for winding in one direction, but will be prevented from unwinding in the opposite direction. However, a friction brake may be provided, as in Figs. 4 and 9, by a spring washer 45, either a flat spring, as shown, or crimped as disclosed in my copending application Serial No. 748,051, now U. S. Patent 2,551,320, and held against the cog 42 by a dual nut 46, i. e. a nut and lock nut, threadedly engaging the body 23 of pinion 22, as in Fig. 9. The washer 45 may, of course, be disposed between cog 42 and base 20 of winding device W. As in Fig. 8, ratchet 44 may be pivotally mounted on the rear flange 16 of spool S, in position to engage cog 42, while leaf spring 43 may be attached at one end to rear flange 16 at a point disposed farther outwardly than and substantially diametrically opposite ratchet 44, the leaf spring 43 extending around the cog 42 and its opposite end, of course, engaging ratchet 44. The spool S is mounted on the end of shaft 24, as by threads, and a recessed head locking screw may be utilized to insure that the spool will remain locked on the shaft. Also, the spool may be provided with a well 47, as in Fig. 4, to accommodate the body 23 of pinion 22 and the parts mounted thereon.

The various parts of the casting reel of this invention may be made of any suitable material, although the housing H is preferably made of a transparent plastic, which enables the user to see the line as it moves in or out on the spool S. The shaft 27 for the winding handle and the winding handle 13, the central shaft 24, the bevel gear 26 and pinion 22, the winding pins 14, the rod 25, the cog 42, the ratchet 44 and ratchet spring 43, and the spring washer 45 and nuts 46, are preferably made of metal, while the remaining parts may be made of plastic or metal, as desired. Plastic is a preferred material for such parts, particularly the guide G, spool S, button 12, base 20 of the winding device W, base 34 of housing H, shaft support 39, and the parts of the auxiliary housing, as they may be made to blend with the housing H, and various parts may be made in different colors. Also, parts of plastic may be made so as to reduce the total weight of the reel.

From the foregoing, it will be apparent that the casting reel of this invention fulfills to a marked degree the requirements and objects hereinbefore set forth. The combination of a normally stationary spool with a cylindrical guide having a smooth edge permits the line to unwind readily, without the possibility of interference by indentations or scallops in the edge of the guide. Also, a winding device that terminates in merely two pins extending parallel to the axis of the spool is relatively simple and does not tend to foul or tangle the line. The separation of the line guide from the winding device simplifies the turning mechanism for the winding device, since it is unnecessary for the winding device to be moved axially. A transparent housing which encloses the spool, guide, and winding device provides a view of the operative parts at all times, yet protects the parts from damage and the line from fouling, due to tree branches and the like. The button for operating the line guide, positioned either at the rear or front end, is easily accessible and in the same place at all times. Also, the winding device is very readily moved from winding to unwinding or casting position, and vice versa. The removable housing permits ready access to the spool for placing a line thereon, and also for threading the line through the nose of the housing from the rear. The conical shape of the nose of the housing also facilitates threading the line through the hole therein.

It will be understood that various changes may be made in the casting reel of this invention, such as in the position of the button for moving the guide from casting or unwinding, to winding or reeling position, and vice versa. Thus, the button may be disposed at the front and comprise a tube extending through the hole in the nose of the housing, through which tube the line 10 passes. By placing a spring outside the housing, surrounding such tube, a spring and latch arrangement including a split spring sleeve, shoulders on a short movable pin connected to guide G, and a cooperating collar, may be provided within a well in shaft 24, so that the tube may be pushed inwardly against the guide G a predetermined distance to move the guide G to winding position, and the tube may be pushed rearwardly a lesser distance to move the guide G to unwinding position. The button for actuating the guide is, of course, readily accessible when in either the rear position, as shown in the drawings, or in a front position, as just indicated. The various parts may, of course, be made in different sizes and of different materials, while the shape of the various parts, particularly the auxiliary housing section and the main housing, may be varied considerably. As will be evident from Figs. 1 and 2, the preferred shape of the housing H, while not essential to the operation of the device, is nevertheless pleasing to the eye, as the entire structure thus has a rocket-like appearance.

It will be understood that other embodiments than those illustrated or described may exist, and that various other changes may be made, all without departing from the spirit and scope of this invention.

What is claimed is:

1. A reel comprising a spool having front and rear flanges; a rotatable winding device adapted to cause a fishing line or the like to be wound onto said spool, and including a cylindrical flange surrounding at least a portion of said rear flange of said spool and at least one pin extending axially from the front of said cylindrical flange, each said pin terminating short of said front flange of said spool; and an axially movable guide having a cylindrical flange generally surrounding at least a portion of said front flange of said spool, said guide being movable between a forward position wherein said cylindrical flange is forward of the front ends of said pins and permits the line to move axially off said spool, and a rear position in which the rear edge of said guide flange is rearward of the front ends of said pins and said line is forced to engage at least one said pin and thereby to be wound on said spool upon rotation of said winding device.

2. A reel as defined in claim 1, wherein said cylindrical flange of said winding device and said cylindrical flange of said guide extends forwardly and rearwardly, respectively, from an annular plate.

3. A reel as defined in claim 2, including a rod extending rearwardly from said annular plate of said guide and through said spool, for moving said guide.

4. A reel as defined in claim 2, including a spring and ratchet mounted on said rear flange of said spool; and wherein said winding device includes ratchet teeth cooperating with said ratchet.

5. A casting reel comprising a housing; a stationary shaft extending axially within said housing from the rear thereof; a spool on which a fishing line or the like may be wound and mounted in generally fixed position on the front end of said shaft, said spool having front and rear flanges; a line guide including an annular plate having a cylindrical, rearwardly extending flange normally surrounding the front flange of said spool; means for moving said guide to front and rear positions; and a winding device mounted for rotation on said shaft, said winding device including an annular plate having a cylindrical, forwardly extending flange surrounding at least a portion of the rear flange of said spool, and a pair of pins extending forwardly from said flange and disposed in diametrically opposite positions, said pins terminating short of said front flange of said spool so that when said guide is in a rear position at least partly covering said pins, the line will be engaged by at least one of said pins so as to be wound upon said spool upon rotation of said winding device, and when said guide is in a front position uncovering said pins, the line may pass off said spool through the space between the ends of said pins and the rear edge of said guide flange.

6. A casting reel comprising a cylindrical housing formed of transparent material and having a conically tapering front end provided with an aperture at the point thereof; a stationary shaft extending axially within said housing from the rear thereof; a spool on which a fishing line or the like may be wound and mounted in generally fixed position on the front end of said shaft, said spool having front and rear flanges; a line guide including an annular plate having a cylindrical, rearwardly extending flange normally surrounding the front flange of said spool; means for moving said guide to front and rear positions; and a winding device mounted for rotation on said shaft, said winding device including an annular plate having a cylindrical, forwardly extending flange surrounding at least a portion of the rear flange of said spool, and a pair of pins extending forwardly from said flange and disposed in diametrically opposite positions, said pins terminating short of said front flange of said spool so that when said guide is in a rear position at least partly covering said pins, the line will be engaged by at least one of said pins so as to be wound upon said spool upon rotation of said winding device, and when said guide is in a front position uncovering said pins, the line may pass off said spool through the space between the ends of said pins and the rear edge of said guide flange.

7. A casting reel comprising a cylindrical housing formed of transparent material and having a conically tapering front end provided with an aperture at the point thereof; a supporting block attached to the underside of the cylindrical portion of said housing and provided with means for attaching said reel to a fishing rod or the like; an annular plate adapted to fit into the rear end of said cylindrical housing and having a central aperture; an auxiliary housing mounted on the rear side of said annular plate and having two parallel flat sides and a generally arcuate rear; a hollow shaft extending axially through said auxiliary housing and into said main housing and attached to said auxiliary housing at the rear end thereof; a rod extending centrally through said shaft and mounted for fritcional resistance to longitudinal movement therein; a spool on which a fishing line or the like may be wound and mounted in generally fixed position on the front end of said shaft within said main housing, said spool having front and rear flanges and a central well at the rear; a guide mounted on the front end of said rod and having a cylindrical, rearwardly extending flange normally surrounding the front flange of said spool; a button mounted on the rear end of said rod, exteriorly of said auxiliary housing, for moving said guide to and from front and rear positions; a bevel pinion mounted for rotation on said shaft, said bevel pinion having teeth disposed in said auxiliary housing and a body extending through the aperture in said housing plate into said spool well; a winding device including an annular plate having a cylindrical, forwardly extending flange surrounding at least a portion of said rear flange of said spool, and a pair of pins extending forwardly from said flange and disposed in diametrically opposite positions, said pins terminating short of said front flange of said spool so that when said cylindrical flange of said guide is in a rear position at least partly uncovering said pins, the line will be engaged by said pins to be wound upon said spool upon rotation of said winding device, and when said cylindrical flange of said guide is in a forward position uncovering said pins, the line may pass off said spool through the space between the ends of said pins and the rear edge of said guide flange; a ratchet cog having ratchet teeth extending around the outer periphery thereof and mounted on the body of said pinion; a spring washer bearing against said cog; a nut and a lock nut threadedly engaging the body of said pinion and holding said spring washer against said ratchet cog and also holding said cog in position; a ratchet pivotally mounted on said rear flange of said spool and adapted to engage said ratchet teeth; a leaf spring attached to said rear flange of said spool opposite said ratchet and extending in a loop around and into contact with said ratchet, so as to hold said ratchet against said ratchet teeth; a laterally extending, frusto-conical shaft and handle support mounted on one of the flat sides of said auxiliary housing; a rotatable shaft extending through said support; a handle for turning said rotatable shaft and mounted on the outer end thereof; and a bevel gear mounted on the inner end of said shaft and disposed within said auxiliary housing, for engaging said bevel pinion so as to turn said winding device.

8. A reel comprising a spool having a line receiving portion and a front, generally radial flange over which said line passes during unwinding; at least one pin for winding said line onto said spool, said pin extending axially with respect to said spool and being spaced radially outwardly from the line receiving portion of said spool at approximately the outer edge of said spool flange, said pin terminating short of said spool flange; means for rotating said pin about the axis of said spool; and a guide having a rearwardly extending, annular flange of a larger diameter than said spool flange and having a smooth rear edge, said guide being movable axially between a front position in which the rear edge of said guide flange is forward of a plane extending perpendicularly to the axis of said spool and containing the free end of said pin, and a rear position in which the rear edge of said guide flange is rearward of said plane.

9. A reel comprising a spool having front and rear flanges; a rotatable winding device adjacent said rear flanges adapted to cause a fishing line or the like to be wound onto said spool, said winding device including a cylindrical flange surrounding at least a portion of said rear flange of said spool, and at least one pin extending axially from the front of said device flange and terminating short of said front flange of said spool; and an axially movable guide adjacent said front flange of said spool, said guide having a cylindrical flange generally surrounding a portion of said front flange of said spool and being movable between a forward position permitting the line to move axially off said spool, and a rear position in which said line is forced to engage said winding device and thereby to be wound on said spool upon rotation of said winding device.

10. A reel comprising a spool; a winding device having a line-engaging element mounted to rotate about said spool and maintain the same axial position with respect to said spool, said line-engaging element, upon rotation and engagement with said line, winding said line onto said spool; a generally annular guide for said line mounted coaxially with respect to said spool; and means for moving said guide axially with respect to said spool and said line-engaging element, between a position in which said guide forces said line to engage said line-engaging element for winding on said spool and a position in which said guide clears said line-engaging element and said line may pass freely over said guide and axially off said spool.

11. A reel as defined in claim 10, wherein said line-engaging element comprises a pin mounted to extend axially with respect to said spool.

12. A reel as defined in claim 10, wherein said guide includes a cylindrical flange surrounding the forward end of said spool.

13. A reel as defined in claim 10, wherein said means for moving said guide includes a rod extending axially through said spool.

14. A reel as defined in claim 13, wherein said means for rotating said winding device includes a bevel pinion rotatable about the axis of said rod; a speed-increasing bevel gear engaging said pinion; and a crank for rotating said bevel gear and rotatable about an axis at right angles to the axis of said spool.

DANIEL B. FERGUSON.

References Cited in the file of this patent

UNITED STATES PATENTS

| Number | Name | Date |
| --- | --- | --- |
| 2,229,470 | Pezon | Jan. 21, 1941 |
| 2,492,587 | Ledingham | Dec. 27, 1949 |
| 2,507,457 | Rix | May 9, 1950 |
| 2,566,344 | Lord | Sept. 4, 1951 |
| 2,600,558 | Mauborgne | June 17, 1952 |

FOREIGN PATENTS

| Number | Country | Date |
| --- | --- | --- |
| 22,597 of 1907 | Great Britain | June 11, 1908 |
| 909,825 | France | Mar. 20, 1946 |